June 24, 1930.  J. F. KNAPP  1,768,259
CONFECTIONER'S APPLIANCE
Filed June 21, 1929   2 Sheets-Sheet 1
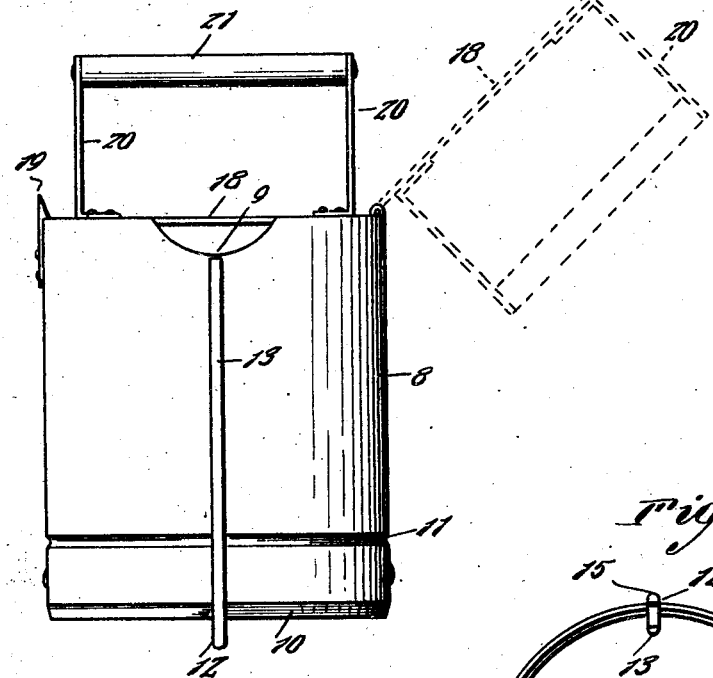
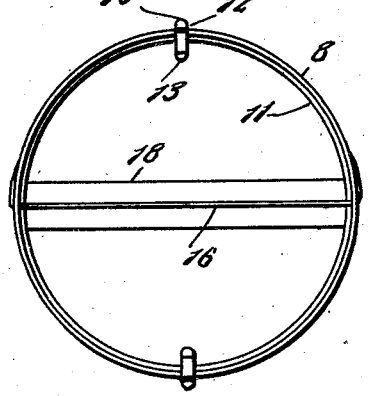
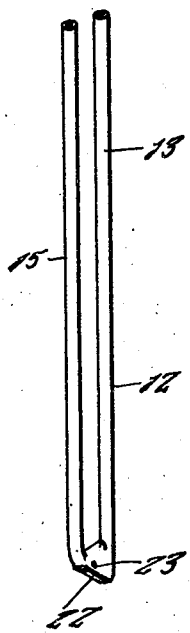
Inventor
Jay F. Knapp
By Clarence A. O'Brien
Attorney

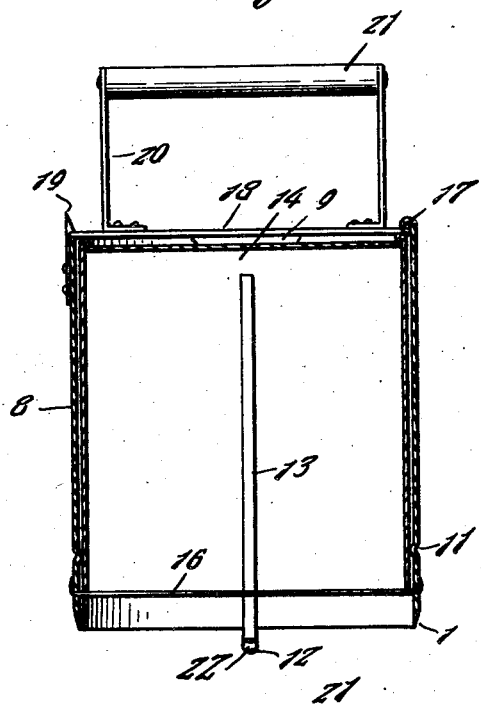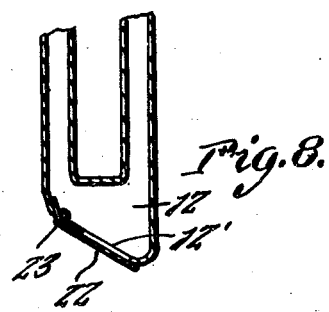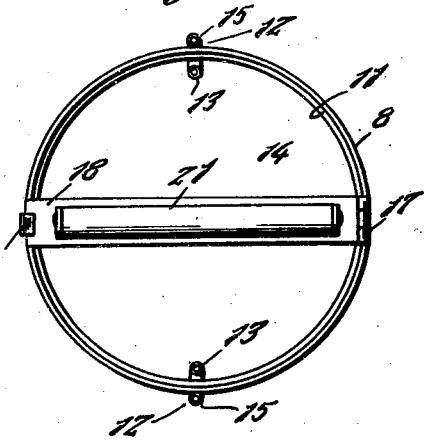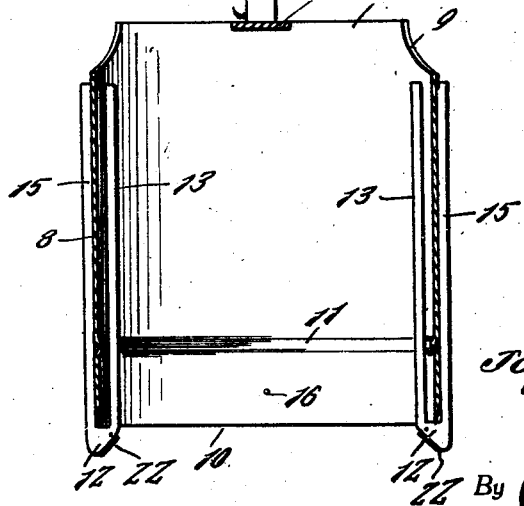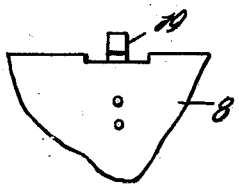

Patented June 24, 1930

1,768,259

UNITED STATES PATENT OFFICE

JAY F. KNAPP, OF GREAT BEND, NEW YORK

CONFECTIONER'S APPLIANCE

Application filed June 21, 1929. Serial No. 372,680.

This invention relates to an improved appliance which is especially but not necessarily adapted for confectioners and ice cream dispensers to facilitate filling of boxes or cartons with ice cream, without requiring the use of a scoop.

In accordance with the present invention I provide a simple and inexpensive device, in which the cardboard carton is placed, the device being such as to permit it to be forced down into the ice cream to be filled, after which it may be withdrawn for wrapping in an expeditious, convenient and sanitary manner.

Broadly stated, the device is in the form of a holder embodying an open ended cylinder, the lower end of which is formed with a knife edge to cut through the ice cream and further provided with a severing element whereby upon turning the holder it may be withdrawn.

A particular feature in the construction is the simplified arrangement of details which facilitates placement and removal of the carton, together with novel means for providing a necessary vent to permit the ice cream to be compactly forced into the carton.

The specific details and their special association will become apparent from the following description and drawings.

In the drawings:

Figure 1 is an elevational view of a device constructed in accordance with the present invention.

Figure 2 is a vertical section through the same.

Figure 3 is a view at right angles to Figure 2 with the ice cream carton removed.

Figure 4 is a top plan view of the structure seen in Figure 2.

Figure 5 is a bottom plan view.

Figure 6 is a perspective view of one of the vent tubes.

Figure 7 is a fragmentary view showing a retaining latch.

Figure 8 is a view in section of the vent tube valve.

The holder as better seen in Figure 3, comprises an open ended cylinder 8, having finger notches 9 in its upper edge portion at diametrically opposite points. The lower edge is sharpened to provide a circular cutting edge 10. The reference character 11 designates an inwardly pressed annular spacing bead or rib. The reference character 12 designates diametrically opposite U-shaped vent tubes, the inner branches 13 of which extend up into the cylinder, in order to permit them to project into the inverted ice cream carton 14, as seen in Figure 2. The outer branches 15 are arranged to relieve any vacuum that might otherwise exist.

Each of the U-shaped vent tubes are provided with an opening 12' at the bight portions thereof, said opening 12' being controlled through the medium of a valve plate 22 hingedly connected to the vent tube at the opening through the medium of a spring hinge 23. This spring hinge will of course normally maintain the valve plate 22 in closed position. The opening and valve covering constitutes for the respective tubes a vacuum release valve for releasing the vacuum which will be formed at the bight portion of these tubes, the valve plate 22 remaining closed when the device is being placed in the cream so that obviously when the device is being pulled from the cream this valve will open to relieve the vacuum and thus permit the device to be lifted out very easily. The reference character 16 designates a cutting wire stretched across the bottom of the cylinder. Above this, and hinged at the top as at 17 is a carrier strip 18, having its free end portion engaged with a resilient retaining latch 19. This strip 18 carries arms 20, which in turn carry a suitable hand grip 21. This entire unit comprising the parts 17 to 21 inclusive may be swung open to the dotted line position seen in Figure 1, to permit insertion and removal of the carton 14. The wire 16, in addition to providing a cutter constitutes a stop on which the open end of the carton rests, as seen in Figure 2. It will be noted that the inner branches 13 of the vent tubes are spaced from the adjacent walls of the cylinders sufficiently to allow for the thickness of the carton.

In practice, it is obvious that the carrier or handle structure is swung open to the dotted line position seen in Figure 1. Then the carton 14 is placed within the cylindrical holder 8, assuming the position represented in Figure 2. Then the holder is ready to be forced down into the body of ice cream in the can. Prior to this, however, it is obvious that the carrier handle is swung back to the position seen in Figure 2, in order to permit the device to be firmly thrust down into the ice cream. As the ice cream fills the carton, it is obvious that a vacuum is built up between it and the bottom of the carton. This is, however, relieved under the action of the air escaping through the U-shaped vent tube 12. Thus, the ice cream may be forced firmly into the carton, after which the device may be given a half turn or so to cause the wire 16 to cut through the ice cream and to release the device, whereupon it may be withdrawn readily.

A consideration of the description in conjunction with the drawings will enable the reader to obtain a clear understanding of the construction and features and advantages of the invention. Therefore a more lengthy description is regarded as unnecessary.

Minor changes in shape, size, materials and rearrangement of details coming within the field of invention claimed may be resorted to, in actual practice, if desired.

I claim:

1. In a carton holder and filling device, a cylinder open at both ends, the lower end of said cylinder being sharpened to provide an annular cutter, a cutting element extending across the lower end of said cylinder, a hingedly mounted handle section mounted on the upper end of said cylinder, and a substantially U-shaped valve controlled vent tube mounted on said cylinder and having one branch thereof adapted to extend into the carton within the cylinder and the other branch thereof disposed exteriorly of said cylinder.

2. In a carton holder and filler of the class described, an open ended cylinder provided adjacent its lower end with an inwardly pressed spacing rib and having its lower end sharpened to provide an annular cutter and provided between the rib and cutter with a cutting wire, a pair of substantially U-shaped vent tubes mounted on said cylinder having branches extending into the cylinder and branches disposed exteriorly of said cylinder, said branches opening upwardly, said U-shaped vent tube being provided with an opening formed in the bight thereof, and an outwardly opening valve plate controlling the opening.

In testimony whereof I affix my signature.

JAY F. KNAPP.